United States Patent
Sirotkin

(10) Patent No.: US 9,516,521 B2
(45) Date of Patent: Dec. 6, 2016

(54) APPARATUS, SYSTEM AND METHOD OF TRANSFERRING CONTROL OF A REMOTE RADIO HEAD BETWEEN BASE-BAND UNIT (BBU) PROCESSING POOLS

(71) Applicant: INTEL IP CORPORATION, Santa Clara, CA (US)

(72) Inventor: Alexander Sirotkin, Giv'on Hachadasha (IL)

(73) Assignee: INTEL IP CORPORATION, Santa Clara, CA (US)

(*) Notice: Subject to any disclaimer, the term of this patent is extended or adjusted under 35 U.S.C. 154(b) by 0 days.

(21) Appl. No.: 14/670,435

(22) Filed: Mar. 27, 2015

(65) Prior Publication Data

US 2016/0029205 A1    Jan. 28, 2016

Related U.S. Application Data

(60) Provisional application No. 62/029,933, filed on Jul. 28, 2014.

(51) Int. Cl.
*H04W 72/00* (2009.01)
*H04W 24/02* (2009.01)
*H04W 16/02* (2009.01)
*H04W 88/08* (2009.01)

(52) U.S. Cl.
CPC ............ *H04W 24/02* (2013.01); *H04W 16/02* (2013.01); *H04W 88/08* (2013.01); *H04W 88/085* (2013.01)

(58) Field of Classification Search
CPC ...... H04W 24/02; H04W 16/02; H04W 88/08; H04W 88/085

USPC ................................ 455/450, 447, 446, 451
See application file for complete search history.

(56) References Cited

U.S. PATENT DOCUMENTS

| | | | |
|---|---|---|---|
| 2005/0245267 A1* | 11/2005 | Guethaus | H04W 88/08 455/450 |
| 2008/0134194 A1* | 6/2008 | Liu | H04W 16/04 718/105 |
| 2011/0237178 A1* | 9/2011 | Seki | H04W 36/18 455/3.01 |

(Continued)

FOREIGN PATENT DOCUMENTS

| WO | 2013123670 | 8/2013 |
|---|---|---|
| WO | 2014025945 | 2/2014 |

OTHER PUBLICATIONS

NGMN Ltd., "Suggestions on Potential Solutions to C-RAN by NGMN Alliance", Version 4.0, Jan. 3, 2013, 41 pages.

(Continued)

*Primary Examiner* — Khai M Nguyen
(74) *Attorney, Agent, or Firm* — Shichrur & Co.

(57) ABSTRACT

Some demonstrative embodiments include devices, systems and/or methods of transferring control of a Remote Radio Head (RRH) between Base-Band Unit (BBU) processing pools. For example, a Base Band Unit (BBU) processing pool may include a transport network interface to communicate with a plurality of Remote Radio Heads (RRHs) via a transport network; and a pool processor to manage a plurality of BBUs, the plurality of BBUs configured to control the plurality of RRHs according to a RRH control protocol, the pool processor being configured to transfer control of at least one RRH of the plurality of RRHs from at least one BBU of the plurality of BBUs to at least one target BBU processing pool.

25 Claims, 7 Drawing Sheets

(56) References Cited

U.S. PATENT DOCUMENTS

| | | | | |
|---|---|---|---|---|
| 2012/0155446 A1* | 6/2012 | Machida | ............ | H04W 52/0232 370/338 |
| 2014/0031049 A1* | 1/2014 | Sundaresan | ............ | H04W 16/02 455/447 |
| 2014/0161438 A1* | 6/2014 | In De Betou | ......... | H04W 24/04 398/5 |
| 2014/0241315 A1* | 8/2014 | Niu | ..................... | H04L 67/1091 370/331 |
| 2014/0317232 A1* | 10/2014 | Wang | .................. | H04L 67/1097 709/217 |

OTHER PUBLICATIONS

NGMN Ltd., "SubTask D4 Deliverable Liaisons, Contributions to 3GPP ETSI on Collaborative Radio/MIMO, ORI Interface, etc. By NGMN Alliance", Version 1.0, Jan. 3, 2013, 20 pages.

Huaning Niu et al., "RAN Architecture Options and Performance for 5G Network Evolution", WCNC 2014, 5 pages.

Wang et al., "A Study on Virtual BS Live Migration—A Seamless and Lossless Mechanism for Virtual BS Migration", 2013 IEEE 24th International Symposium on Personal, Indoor and Mobile Radio Communications: Mobile and Wireless Networks, Sep. 2013, 5 pages.

Search Report and Written Opinion for PCT/US2015/037602, mailed on Oct. 7, 2015, 13 pages.

Cheng Liu et al., "A Novel Multi-Service Small-Cell Cloud Radio Access Network for Mobile Backhaul and Computing Based on Radio-Over-Fiber Technologies", Journal of Lightwave Technology, vol. 31, No. 17, Sep. 1, 2013, 7 pages, pp. 2689-2875, ISSN 0733-8724 © 2013 IEEE.

* cited by examiner

US 9,516,521 B2

APPARATUS, SYSTEM AND METHOD OF TRANSFERRING CONTROL OF A REMOTE RADIO HEAD BETWEEN BASE-BAND UNIT (BBU) PROCESSING POOLS

CROSS REFERENCE

This application claims the benefit of and priority from U.S. Provisional Patent Application No. 62/029,933 entitled "Inter-BBU Pool Migration", filed Jul. 28, 2014, the entire disclosure of which is incorporated herein by reference.

TECHNICAL FIELD

Some embodiments described herein generally relate to transferring control of a Remote Radio Head (RRH) between Base-Band Unit (BBU) processing pools.

BACKGROUND

A Centralized, Cooperative, or Cloud Radio Access Network (C-RAN) may include a plurality of distributed Remote Radio Units (RUs) (also referred to as "Remote Radio Heads (RRHs)"), which may be connected to a cloud via a transport network, for example, a high-bandwidth and low-latency transport network, e.g., an optical fiber transport network.

The C-RAN may include a plurality of Base Band Units (BBUs) (also referred to as Digital units (DUs). The BBUs may communicate with the RRHs using an interface, for example, a Common Public Radio Interface (CPRI), or any other interface.

According to a "localized BBU pool" architecture (also referred to as a "small scale C-RAN" or "localized C-RAN)"), an operator may deploy a plurality of BBU processing pools, e.g., small or medium sized BBU pools, to control the plurality of RRHs, e.g., a moderate number of RRHs. A BBU processing pool may include a plurality of BBUs.

According to the document "SUGGESTIONS ON POTENTIAL SOLUTIONS TO C-RAN BY NGMN ALLIANCE", the Next Generation Mobile Networks (NGMN) Alliance, Version 4.0, Jan. 3, 2013, ("the NGMN document") the small cell C-RAN architecture may be, for example, suitable for operators having a large number of site machine room resources. According to the NGMN document, a small/medium scale C-RAN architecture may be advantageous, for example, since a C-RAN deployment beyond a certain size may have only marginal performance gains.

There is a need for efficient management and/or interworking of BBU pools, e.g., in a localized C-RAN deployment, and/or in any other architecture.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
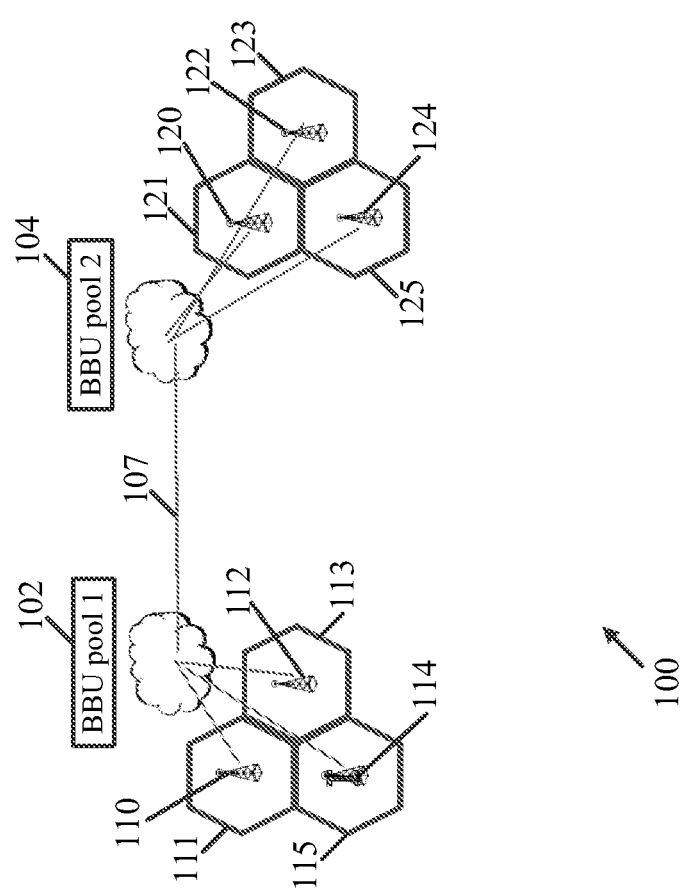
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices, networks, and systems, for example, a computer, a server computer, a cloud computer, a Digital Unit (DU), a Base Band Unit (BBU), a BBU processing pool, a Centralized, Cooperative, or Cloud Radio Access Network (C-RAN) system, a localized C-RAN, a localized BBU pool, a small scale C-RAN, a C-RAN processor, a C-RAN computer, a C-RAN server, a C-RAN processing pool, a C-RAN cloud, a Base Station (BS), a node, a cellular network, a cellular node, and the like.

Some embodiments may be used in conjunction with devices and/or networks operating in accordance with existing 3rd Generation Partnership Project (3GPP) and/or Long Term Evolution (LTE) documents and/or specifications and/or future versions and/or derivatives thereof, devices and/or networks operating in accordance with existing Next Generation Mobile Networks (NGMN) Alliance documents and/or specifications (including "SUGGESTIONS ON POTENTIAL SOLUTIONS TO C-RAN BY NGMN ALLIANCE", the Next Generation Mobile Networks (NGMN) Alliance, Version 4.0, Jan. 3, 2013; and/or "SUB TASK D4 DELIVERABLE LIAISONS, CONTRIBUTIONS TO 3GPP ETSI ON COLLABORATIVE RADIO/MIMO, ORI INTERFACE, ETC, BY NGMN ALLIANCE, Version 1.0", Jan. 3, 2013) and/or future versions and/or derivatives thereof, units and/or devices, which are part of the above networks, and the like.

Some embodiments may be used in conjunction with one or more types of wireless communication signals and/or systems, for example, Radio Frequency (RF), Frequency-Division Multiplexing (FDM), Orthogonal FDM (OFDM), Single Carrier Frequency Division Multiple Access (SC-FDMA), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wireless Fidelity (Wi-Fi), Wi-Max, ZigBee™, Ultra-Wideband (UWB), Global System for Mobile communication (GSM), second generation (2G), 2.5G, 3G, 3.5G, 4G, Fifth Generation (5G) mobile networks, 3GPP, Long Term Evolution (LTE) cellular system, LTE advance cellular system, High-Speed Downlink Packet Access (HSDPA), High-Speed Uplink Packet Access (HSUPA), High-Speed Packet Access (HSPA), HSPA+, Single Carrier Radio Transmission Technology (1×RTT), Evolution-Data Optimized (EV-DO), Enhanced Data rates for GSM Evolution (EDGE), and the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments are described herein with respect to a LTE network. However, other embodiments may be implemented in any other suitable cellular network or system, e.g., a Universal Mobile Telecommunications System (UMTS) cellular system, a GSM network, a 3G cellular network, a 4G cellular network, a 4.5G network, a 5G cellular network, a WiMax cellular network, and the like.

Some demonstrative embodiments may be used in conjunction with a Centralized, Cooperative, or Cloud Radio Access Network (C-RAN), which may utilize a deployment of a plurality of Remote Radio Heads (RRHs) controlled by a plurality of Base Band Units (BBUs) via a transport network.

Other embodiments may be used in conjunction with any other suitable communication network and/or architecture.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a dipole antenna, a set of switched beam antennas, and/or the like.

The term "cell", as used herein, may include a combination of network resources, for example, downlink and optionally uplink resources. The resources may be controlled and/or allocated, for example, by a cellular node (also referred to as a "base station"), or the like. The linking between a carrier frequency of the downlink resources and a carrier frequency of the uplink resources may be indicated in system information transmitted on the downlink resources.

In one example, one or more functionalities of a cellular node may be distributed between a BBU and a RRH, for example, according to a C-RAN architecture or any other architecture, e.g., as described below.

Reference is now made to FIG. 1, which schematically illustrates a block diagram of a system 100, in accordance with some demonstrative embodiments.

In some demonstrative embodiments, system 100 may include a plurality of Base-Band Unit (BBU) processing pools (also referred to as "Digital Unit (DU) pools" or "BBU pools"), e.g., including a BBU processing pool 102, and/or a BBU processing pool 104, which may control a plurality of Remote Radio Heads (RRHs) (also referred to as "Remote Radio Units (RUs)").

For example, as shown in FIG. 1, BBU processing pool 102 may control a plurality of RRHs, e.g., including RRH 110, RRH 112, and/or RRH 114; and/or BBU processing pool 104 may control a plurality of RRHs, e.g., including RRH 120, RRH 122, and/or RRH 124.

In some demonstrative embodiments, BBU processing pools 102 and/or 104 may be connected to the plurality of RRHs via a transport network, for example, a high-bandwidth and low-latency transport network, e.g., an optical fiber transport network, and/or any other transport network.

In some demonstrative embodiments, RRHs 110, 112, 114, 120, 122, and/or 124 may include circuitry, logic and/or a processing system configured to perform radio functionalities, for example, from Radio-Frequency (RF) transmission and/or reception to digital baseband and/or adaptation to the transport network, and/or any other operations, communications and/or functionalities. For example, RRHs 110, 112, 114, 120, 122, and/or 124 may include circuitry, logic and/or a processing system configured to perform RF amplification, up conversion, down conversion, filtering, Analog to Digital (A/D) conversion, Digital to Analog (D/A) conversion, interface adaptation, data compression, and/or cell-specific processing, e.g., Fast Fourier Transform (FFT), Inverse FFT (IFFT), framing, and the like. A RRH may be connected directly to a BBU via the transport network, or via one or more other RRHs, e.g., via a chain of one or more RRHs.

In some demonstrative embodiments, BBU processing pools 102 and/or 104 may include, or may be implemented as, a BBU cloud (also referred to as "Digital Unit (DU) cloud").

In some demonstrative embodiments, a BBU processing pool may include a plurality of BBUs, for example, a plurality of identical BBUs interconnected together, or any other combination of identical or different BBUs.

In some demonstrative embodiments, a BBU of a BBU processing pool may be configured to control a RRH connected to the BBU processing pool.

In some demonstrative embodiments, a functionality of a cellular node, for example, an evolved Node B (eNB) or any other cellular node or base station, may be divided between a BBU and a RRH to be controlled by the BBU.

For example, a first BBU of BBU processing pool 102 may control RRH 110 to communicate with one or more User Equipments (UEs) within a cell 111, a second BBU of BBU processing pool 102 may control RRH 112 to communicate with one or more UEs within a cell 113, and/or a third BBU of BBU processing pool 102 may control RRH 114 to communicate with one or more UEs within a cell 115. For example, a first BBU of BBU processing pool 104 may control RRH 120 to communicate with one or more UEs within a cell 121, a second BBU of BBU processing pool 104 may control RRH 122 to communicate with one or more UEs within a cell 123, and/or a third BBU of BBU processing pool 104 may control RRH 124 to communicate with one or more UEs within a cell 125.

In some demonstrative embodiments, BBUs of BBU processing pool 102 may be configured to communicate with RRHs 110, 112, and/or 114, for example, via a Common Public Radio Interface (CPRI), or any other interface; and/or BBUs of BBU processing pool 104 may be configured to communicate with RRHs 120, 122, and/or 124, for example, via a CPRI, or any other interface In some demonstrative embodiments, a BBU processing pool may be configured, for example, to provide a capacity to aggregate processing power of the BBUs in the BBU processing pool, and/or to allocate the processing power of the BBUs in the BBU processing pool, for example, to real time tasks, e.g., according to network load.

In some demonstrative embodiments, BBU processing pool 102 and/or BBU processing pool 104 may be configured to communicate via an interface 107. For example, interface 107 may include a CPRI, or any other interface.

Figure 2:
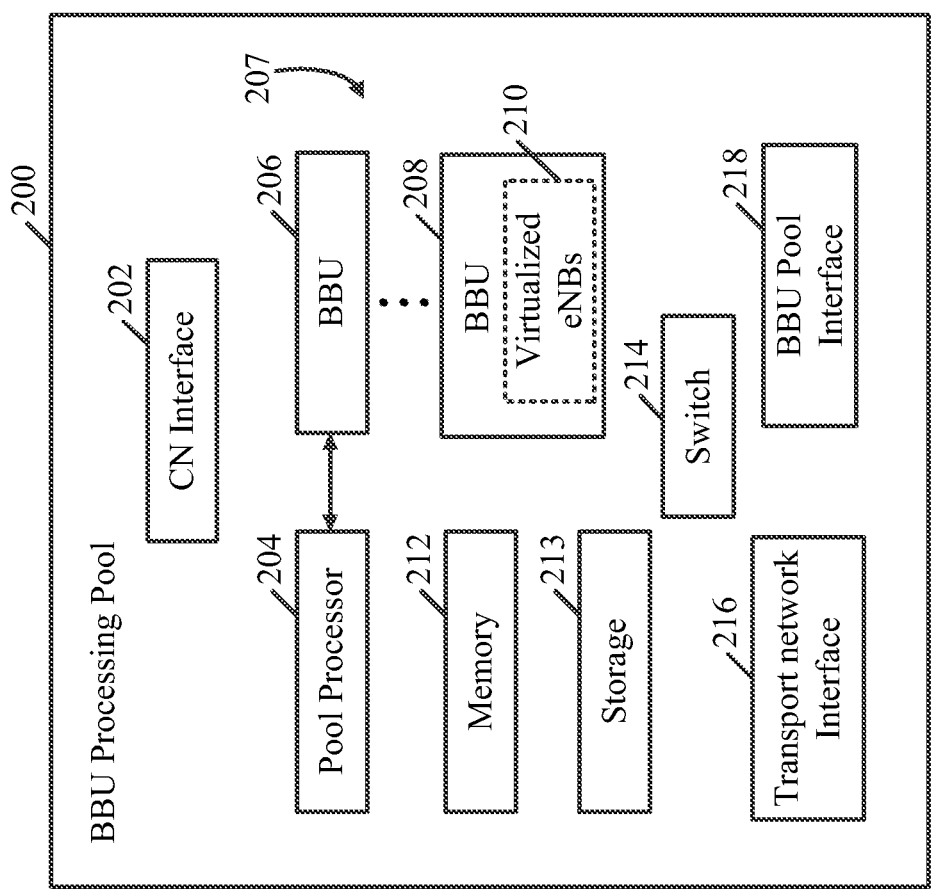
FIG. 2 is a schematic block diagram illustration of a Base Band Unit (BBU) processing pool, in accordance with some demonstrative embodiments.

Reference is made to FIG. 2, which schematically illustrates a BBU processing pool 200, in accordance with some demonstrative embodiments. For example, BBU processing pool 200 may perform the functionality of BBU processing pool 102 (FIG. 1) and/or BBU processing pool 104 (FIG. 1).

In some demonstrative embodiments, BBU processing pool 200 may include a Core Network (CN) interface 202 configured to interface between BBU processing pool 200 and a core network. In one example, CN interface 2002 may include an S1 interface configured to interface with the CN via a S1 Application protocol (S1AP), or any other interface.

In some demonstrative embodiments, BBU processing pool 200 may include a transport network interface 216 to communicate with a plurality of RRHs via a transport network. For example, transport network interface 216 may include a CPRI, or any other interface. Transport network interface 216 may be configured, for example, to communicate over an optical fiber transport network and/or any other network.

In some demonstrative embodiments, BBU processing pool 200 may include a pool processor 204 configured to manage a plurality of BBUs 207, for example, including BBU 206 and/or BBU 208, e.g., as described below.

In some demonstrative embodiments, pool processor 204 may include circuitry, logic and/or a processing system, e.g., processor circuitry and/or logic, memory circuitry and/or logic, and/or any other circuitry, logic and/or processing elements, configured to perform the functionality of pool processor 204. Additionally or alternatively, one or more functionalities of pool processor 204 may be implemented by logic, which may be executed by a machine and/or one or more processors, e.g., as described below. In one example, pool processor 204 may include one or more processors having circuitry and/or logic to cause one or more elements of a device or system, e.g., BBU processing pool 200, to perform one or more functionalities, e.g., as described herein.

In some demonstrative embodiments, pool processor 204 may include, for example, a Central Processing Unit (CPU), a Digital Signal Processor (DSP), one or more processor cores, a single-core processor, a dual-core processor, a multiple-core processor, a microprocessor, a host processor, a server processor, a controller, a plurality of processors or controllers, a chip, a microchip, one or more circuits, circuitry, a logic unit, an Integrated Circuit (IC), an Application-Specific IC (ASIC), and/or any other suitable multi-purpose or specific processor and/or controller.

In some demonstrative embodiments, the plurality of BBUs 207, e.g., BBUs 206 and/or 208, may be configured to control the plurality of RRHs according to a RRH control protocol.

In some demonstrative embodiments, the RRH control protocol may include a CPRI protocol. In other embodiments, the RRH control protocol may include any other protocol.

In one example, BBU processing pool 200 may perform the functionality of BBU processing pool 102 (FIG. 1). According to this example, BBU 206 may be configured to control a first RRH of RRHs 110, 112, and/or 114 (FIG. 1), and/or BBU 208 may be configured to control a second RRH of RRHs 110, 112, and/or 114 (FIG. 1).

In another example, BBU processing pool 200 may perform the functionality of BBU processing pool 104 (FIG. 1). According to this example, BBU 206 may be configured to control a first RRH of RRHs 120, 122, and/or 124 (FIG. 1), and/or BBU 208 may be configured to control a second RRH of RRHs 120, 122, and/or 124 (FIG. 1).

In some demonstrative embodiments, the plurality of BBUs 207 may include a plurality of virtualized Evolved Node Bs (eNBs). For example, BBU 208 and/or BBU 206 may include a virtualized eNB 210.

In some demonstrative embodiments, BBU processing pool 200 may include a BBU pool interface 218 to interface between BBU processing pool 200 and one or more other BBU processing pools. In one example, BBU processing pool 102 (FIG. 1) may include BBU pool interface 218 to interface between BBU processing pool 102 (FIG. 1) and BBU processing pool 104 (FIG. 1), and/or one or more other BBU processing pools. In another example, BBU processing pool 104 (FIG. 1) may include BBU pool interface 218 to interface between BBU processing pool 104 (FIG. 1) and BBU processing pool 102 (FIG. 1), and/or one or more other BBU processing pools.

In some demonstrative embodiments, BBU pool interface 218 may include a CPRI, and/or any other interface.

In some demonstrative embodiments, BBU processing pool 200 may include at least one switching element ("switch") 214 configured to switch a control path of a RRH between a BBU of BBU processing pool 214 and a BBU of another BBU processing pool, e.g., as described below.

In some demonstrative embodiments, at least one switching element 214 may be implemented as part of BBU processing pool 200, for example, as a CPRI port.

In some demonstrative embodiments, at least one switching element 214 may be implemented as an external element, e.g., separate from BBU processing pool 200, for example, between BBU processing pool 200 and an RRH, and/or as part of an RRH.

In some demonstrative embodiments, BBU processing pool 200 may include a memory unit 212, a storage unit 213 and/or any other units or elements. Memory unit 212 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 213 includes, for example, a hard disk drive, a floppy disk drive, a Compact Disk (CD) drive, a CD-ROM drive, a DVD drive, or other suitable removable or non-removable storage units. Memory unit 212 and/or storage 213, for example, may store data processed by BBU processing pool 200, e.g., by processor 204.

Referring back to FIG. 1, in some demonstrative embodiments, BBU processing pools of system 100, e.g., BBU processing pools 102 and/or 104, may be deployed, for example, according to a "localized BBU pool" architecture (also referred to as a "small scale C-RAN" or "localized C-RAN)"), or any other architecture.

In one example, an operator may deploy a plurality of BBU processing pools, for example, small or medium sized BBU pools, to control, for example, the plurality of RRHs, e.g., RRHs 110, 112, 114, 120, 122, and/or 124. The small scale C-RAN architecture may be, for example, suitable for operators having a large number of site machine room resources. The small scale C-RAN architecture may be, for example, advantageous, e.g., when a C-RAN deployment beyond a certain size may have only marginal performance gains. The small scale C-RAN architecture may be utilized for any other reason.

In other embodiments, BBU processing pools of system 100, e.g., BBU processing pools 102 and/or 104, may be deployed according to any other architecture.

In some demonstrative embodiments, a localized C-RAN deployment may be disadvantageous, for example, if during "off peak" hours, e.g., when a load in certain geographical areas is low, it may not be possible to turn off all resources of a localized BBU processing pool controlling the certain area, as would have been possible, for example, with a centralized BBU pool controlling a larger geographical area.

In some demonstrative embodiments, a localized C-RAN deployment may be disadvantageous, for example, if the localized C-RAN deployment is not configured to enable and/or support sharing of resources between two or more BBU processing pools. In one example, a localized C-RAN architecture may be able to allow a reduced number of opportunities for load balancing, e.g., if the localized C-RAN deployment is not configured to enable and/or support sharing of resources between two or more BBU processing pools.

In some demonstrative embodiments, BBU processing pools 102 and/or 104 may be configured to support inter-BBU pool migration, e.g., as described below.

In some demonstrative embodiments, BBU processing pools 102 and/or 104 may be configured to enable live migration of one or more eNBs, e.g., virtualized eNBs, from a first localized BBU pool, e.g., BBU processing pool 102, to a second, e.g., neighbor, BBU pool, e.g., BBU processing pool 104, and/or vice versa.

In some demonstrative embodiments, BBU processing pools 102 and/or 104 may be configured to trigger and/or control the inter-BBU pool migration, for example, for energy saving, load balancing, and/or any other purpose.

In some demonstrative embodiments, interface 107 may be configured to provide sufficient backhaul resources between the BBU processing pools 102 and 104, e.g., sufficient to support the inter-BBU pool migration.

In some demonstrative embodiments, the inter-BBU pool migration may include transferring control of at least one RRH from at least one BBU of a first BBU processing pool ("the source BBU processing pool") to least one second BBU processing pool ("the target BBU processing pool").

In one example, pool processor 204 (FIG. 2) of BBU processing pool 102 may be configured to transfer control of at least one RRH of a plurality of RRHs controlled by BBU processing pool 102, e.g., RRH 110, RRH 112, and/or RRH 114, from at least one BBU of BBUs 207 (FIG. 2) to at least one target BBU processing pool, e.g., to BBU processing pool 104.

In another example, pool processor 204 (FIG. 2) of BBU processing pool 104 may be configured to transfer control of at least one RRH of a plurality of RRHs controlled by BBU processing pool 104, e.g., RRH 120, RRH 122, and/or RRH 124, from at least one BBU of BBUs 207 (FIG. 2) to at least one target BBU processing pool, e.g., to BBU processing pool 102.

In some demonstrative embodiments, a procedure of inter-BBU pool migration may include, for example, triggering the inter-BBU pool migration, for example, as part of a trigger stage, procedure, or operation.

In some demonstrative embodiments, inter-BBU pool migration may be triggered, for example, based on a load condition, a power condition, an energy-saving condition, and/or any other condition, criterion and/or scenario, e.g., as described below.

In some demonstrative embodiments, inter-BBU pool migration may be triggered, for example, based on a load balancing condition or scenario.

In some demonstrative embodiments, the inter-BBU pool migration may be triggered, for example, when a load of the source BBU pool and/or a load of an eNB of the source BBU pool are high, e.g., for load balancing purposes. According to these embodiments, the load on the source BBU pool and/or the load on the eNB of the source BBU pool may decrease, e.g., after the inter-BBU pool migration.

In some demonstrative embodiments, a first BBU pool, e.g., BBU processing pool 102, may experience an increased load, e.g., a high load for load balancing purposes, while a second BBU pool, for example, a neighboring BBU pool, e.g., BBU processing pool 104, may experience a reduced load, e.g., the BBU may be underutilized.

In some demonstrative embodiments, inter-BBU pool migration may be triggered, for example, to migrate one or more virtual eNBs from the source BBU pool to the target BBU pool, for example, without service interruption, e.g., as described below.

In some demonstrative embodiments, the migrating of an eNB from the source BBU pool to the target BBU pool may be performed, for example, by transferring control over a RRH being controlled by a BBU in the source BBU pool, e.g., a BBU performing the functionality of the eNB, from the BBU in the source BBU poll to a BBU in the target BBU pool, e.g., as described below.

In some demonstrative embodiments, inter-BBU pool migration may be triggered, for example, based on a power saving or energy saving condition or scenario.

In some demonstrative embodiments, a first BBU pool, e.g., BBU processing pool 102, may experience a reduced load, e.g., a very low load, for example, during "off-peak" hours and/or in any other situation or scenario.

In some demonstrative embodiments, inter-BBU pool migration may be triggered, for example, to migrate one or more virtual eNBs running on the source BBU pool, e.g., some or all virtual eNBs running on the source BBU pool, to the target BBU pool, for example, without service interruption for the users being served by the virtual eNBs.

In some demonstrative embodiments, the source BBU pool and/or one or more BBUs executing the transferred virtual eNBs may be powered off or may be switched to a reduced power mode, for example, upon migrating the virtual eNBs to the target BBU pool.

In some demonstrative embodiments, inter-BBU pool migration may be triggered, for example, by a BBU processing pool, e.g., the source BBU processing pool or the target BBU processing pool.

In some demonstrative embodiments, inter-BBU pool migration may be triggered, for example, by the pool processor of the BBU processing pool.

In some demonstrative embodiments, inter-BBU pool migration may be triggered, for example, by a BBU of the BBU processing pool.

In some demonstrative embodiments, inter-BBU pool migration may be triggered, for example, by a virtualized eNB being executed by the BBU of the BBU processing pool.

In some demonstrative embodiments, pool processor 204 (FIG. 2) of BBU processing pool 102 may trigger the transfer of the control of one or more RRHs, for example, while maintaining control of one or more RRHs at BBU processing pool 102.

In some demonstrative embodiments, pool processor 204 (FIG. 2) of BBU processing pool 102 may trigger the transfer of the control of a RRH of a plurality of RRHs controlled by BBU processing pool 102, e.g., RRH 110, RRH 112, and/or RRH 114, for example, based on a load of BBU processing pool 102, and/or based on any other condition and/or criterion.

In some demonstrative embodiments, pool processor 204 (FIG. 2) of BBU processing pool 102 may trigger the transfer of the control of the RRH, for example, when the load of BBU processing pool 102 is greater than a first BBU load threshold, e.g., a maximal BBU load threshold.

In some demonstrative embodiments, pool processor 204 (FIG. 2) of BBU processing pool 102 may trigger the transfer one or more of the plurality of RRHs, e.g., some or all of the plurality of RRHs, controlled by BBU processing pool 102, e.g., all of RRH 110, RRH 112, and RRH 114, to the at least one target BBU processing pool, e.g., to BBU processing pool 104.

In some demonstrative embodiments, pool processor 204 (FIG. 2) of BBU processing pool 102 may trigger the transfer all of the plurality of RRHs controlled by BBU processing pool 102, for example, when a load of BBU processing pool 102 is less than a second BBU load threshold, e.g., a minimal BBU load threshold, and/or based on any other condition and/or criterion.

In some demonstrative embodiments, pool processor 204 (FIG. 2) of BBU processing pool 102 may trigger the transfer of the control of a RRH of a plurality of RRHs controlled by BBU processing pool 102, e.g., RRH 110, RRH 112, and/or RRH 114, for example, based on a load of a target BBU processing pool, e.g., BBU processing pool 104. In one example, pool processor 204 (FIG. 2) of BBU processing pool 102 may trigger the transfer of the control of a RRH of a plurality of RRHs controlled by BBU processing pool 102 to BBU processing pool 104, for example, if the load of BBU processing pool 104 is lower than a load of BBU processing pool 102.

In some demonstrative embodiments, the inter-BBU pool migration may be trigged by another network entity.

In one example, the inter-BBU pool mitigation may be triggered by an Operations and Management (OAM) network entity, a hypervisor, a management entity, and/or any other network entity.

In some demonstrative embodiments, the inter-BBU pool migration may be trigged by any other entity.

In one example, the inter-BBU pool mitigation may be triggered by a hypervisor, and/or any other element or entity.

In some demonstrative embodiments, pool processor 204 (FIG. 2) of BBU processing pool 102 may be configured to transfer the control of at least one RRH, e.g., RRH 110, 112, and/or 114, to BBU processing pool 104, for example, based on a request from an OAM network entity.

In some demonstrative embodiments, the procedure of inter-BBU pool migration may include, for example, selecting a target for the inter-BBU migration, for example, as part of a target selection stage, procedure, or operation.

In some demonstrative embodiments, selecting the target for the inter-BBU migration may include, for example, selecting a target BBU pool for the inter-BBU pool migration.

In some demonstrative embodiments, selecting the target for the inter-BBU migration may include, for example, selecting a target BBU, e.g., a target eNB, in the target BBU pool.

In some demonstrative embodiments, the target for the inter-BBU migration may be selected by the source BBU processing pool and/or the source eNB.

In some demonstrative embodiments, pool processor 204 (FIG. 2) of BBU processing pool 102 may be configured to select the target BBU processing pool and/or the target eNB.

In some demonstrative embodiments, pool processor 204 (FIG. 2) of BBU processing pool 102 may be configured to select the target BBU processing pool and/or the target eNB, for example, based on a load of the target BBU processing pool and/or a load of the target eNB. Pool processor 204 (FIG. 2) of BBU processing pool 102 may be configured to select the target BBU processing pool and/or the target eNB based on any other additional or alternative criterion and/or condition.

In some demonstrative embodiments, the target BBU pool and/or the target eNB may be selected by another network entity.

In one example, the target BBU pool and/or the target eNB may be selected by an OAM network entity, a hypervisor, a management entity, and/or any other network entity.

In some demonstrative embodiments, the target BBU pool and/or the target eNB may be selected by any other entity.

In one example, the target BBU pool and/or the target eNB may be selected by a hypervisor, and/or any other element or entity.

In some demonstrative embodiments, pool processor 204 (FIG. 2) of BBU processing pool 102 may be configured to receive an indication of the target BBU processing pool and/or the target eNB from an OAM network entity.

In some demonstrative embodiments, the target BBU pool and/or the target eNB of the target BBU pool may be selected, e.g., by the source BBU pool/eNB or by the OAM, for example, based on load report corresponding to the load of the target BBU pool and/or target eNB.

In some demonstrative embodiments, one or more potential candidates for migration, e.g., one or more potential BBU processing pools and/or one or more potential eNBs, may be semi-statically pre-provisioned.

In some demonstrative embodiments, the procedure of inter-BBU pool migration may include, for example, preparing the target BBU for the inter-BBU migration, for example, as part of a preparation stage, procedure, or operation.

In some demonstrative embodiments, preparing the target BBU for the inter-BBU migration may include, for example, signaling to the target BBU information corresponding to the inter-BBU migration, e.g., as described below.

In some demonstrative embodiments, the source eNB may send to a target eNB of the target BBU processing pool a message, e.g., a migration preparation message, which may include, for example, information about cells controlled by the source eNB and/or information about one or more RRHs being used by the source eNB.

In some demonstrative embodiments, signaling between the source and the target BBU pools may be performed, for example, using an enhanced X2 Application Protocol (X2AP) or any other protocol, e.g., as described below.

In some demonstrative embodiments, the source BBU pool or source eNB may send a migration preparation message, for example, using an enhanced X2AP or any other protocol, e.g., as described below.

In some demonstrative embodiments, the enhanced X2AP protocol may be configured to exchange messages, e.g., the mitigation preparation message, between two eNBs, e.g., the source eNB and the target eNB.

In some demonstrative embodiments, using the enhanced X2AP protocol to signal the migration preparation message between the source and target eNBs may enable, for example, to migrate a cell from the source eNB to the target eNB.

In some demonstrative embodiments, another protocol, e.g., a dedicated protocol, may be used for signaling between the source and the target BBU pools.

In some demonstrative embodiments, the dedicated protocol may be configured to exchange messages, e.g., the mitigation preparation message, by one or more other elements, for example, a Migration Manager, a Hypervisor, and the like. According to these embodiments, an eNB may be migrated from the source BBU processing pool to the target BBU processing pool.

In some demonstrative embodiments, the migration preparation message may carry cell specific information, connected UE information, LTE protocol stack status information, S1 Application protocol (S1AP) status information, and/or any other information, which may be used by the target eNB, for example, to replicate the status of the source eNB.

In some demonstrative embodiments, pool processor 204 (FIG. 2) of a source BBU processing pool, e.g., BBU processing pool 102, may cause the source BBU processing pool to send a request message to the target BBU processing pool, e.g., BBU processing pool 104.

In some demonstrative embodiments, the request message may include, for example, at least cell information of a cell controlled by the BBU to be transferred to the target BBU processing pool, User Equipment (UE) information of UEs in the cell, and/or any other information.

In some demonstrative embodiments, the source BBU processing pool may send the request message in an X2 Application Protocol message, for example, an eNB migration request message, e.g., as described below.

In some demonstrative embodiments, pool processor 204 (FIG. 2) of the target BBU processing pool, e.g., BBU processing pool 104, may receive the request message and may cause the target BBU processing pool to control the RRH being transferred from the source BBU processing pool.

In some demonstrative embodiments, pool processor 204 (FIG. 2) of BBU processing pool 104 may be configured to receive from a source BBU pool, e.g., BBU processing pool 102, a request to transfer control of at least one RRH from the source BBU pool to BBU processing pool 104. According to these embodiments, pool processor 204 (FIG. 2) of BBU processing pool 104 may be configured to cause a BBU of BBU processing pool 104 to control the RRH being transferred from the source BBU processing pool.

In some demonstrative embodiments, pool processor 204 (FIG. 2) of BBU processing pool 104 may be configured to receive the request including the cell specific information, LTE protocol stack status information, S1 Application protocol (S1AP) status information, and/or any other information, e.g., as described above. Pool processor 204 (FIG. 2) of BBU processing pool 104 may be configured to replicate the status of the source eNB, for example, at BBU processing pool 104, for example, using the information from the request.

In some demonstrative embodiments, the target BBU processing pool, e.g., pool processor 204 (FIG. 2) of BBU processing pool 104, may be configured to instantiate one or more new virtualized eNBs, for example, to assume control over the one or more RRHs being transferred to the control of the target BBU processing pool. In one example, pool processor 204 (FIG. 2) of BBU processing pool 104, may be configured to instantiate a virtualized eNBs, for example, with respect to a respective source eNB being migrated to BBU processing pool 104.

Figure 3:
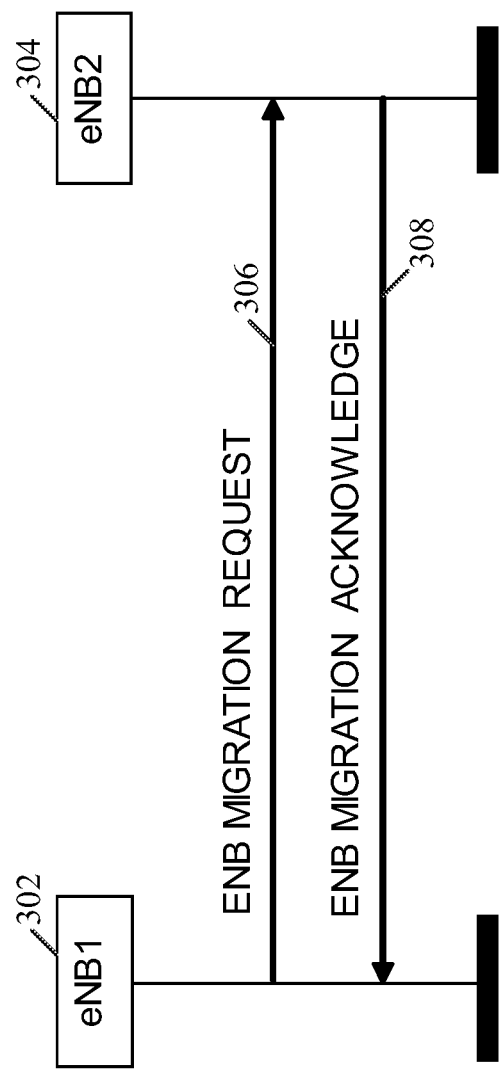
FIG. 3 is a schematic illustration of a message exchange between a first Evolved node B (eNB) and a second eNB, in accordance with some demonstrative embodiments.

Reference is made to FIG. 3, which schematically illustrates a message exchange between a first eNB 302 and a second eNB 304, in accordance with some demonstrative embodiments. For example, eNB 302 may perform the functionality of a source eNB, and/or eNB 302 may perform the functionality of a target eNB. For example, eNB 302 may perform the functionality of a source eNB being executed by a BBU of BBU processing pool 102 (FIG. 1), and/or eNB 302 may perform the functionality of a target eNB being executed by a BBU of processing pool 104 (FIG. 1).

In some demonstrative embodiments, eNB 302 may send an eNB migration request 306 to eNB 304.

In some demonstrative embodiments, eNB migration request 306 may be communicated, for example, as part of an eNB migration preparation procedure, for example, to transfer all context, e.g., which may be needed, for example, to perform eNB and/or cell migration, from the source eNB, e.g., eNB 302, to the target eNB, e.g., eNB 304 or to a target BBU processing pool, e.g., as described above.

In some demonstrative embodiments, eNB migration request 306 may include, for example, eNB information, cell information, UE context, and/or any other information.

In some demonstrative embodiments, the eNB information may include, for example, an eNB name, an eNB identification (ID), and/or any other information relating to the source eNB.

In some demonstrative embodiments, the cell information may include for example, information, e.g., some or all information, which may be broadcast using a System Information Block (SIB), e.g. a cell id, a Public Land Mobile Network (PLMN) identity, frequencies, and the like.

In some demonstrative embodiments, the UE context may include information, e.g., some or all information, relating to connected UEs, for example, at least some of the information ("handover information"), which may be passed to a target eNB upon handover. The UE context information included in the eNB migration request 306 may include, for example, the handover information for all UEs, e.g., whereas during handover of a UE from one eNB to another eNB, only information for the single UE is passed.

In some demonstrative embodiments, the eNB migration request 306 may include, for example, one or more fields, e.g., as follows:

TABLE 1

| IE/Group Name | Presence | Range | IE type and reference | Semantics description | Criticality | Assigned Criticality |
|---|---|---|---|---|---|---|
| Direction: eNB → eNB | | | | | | |
| Message Type | M | | 9.2.1.1 | | YES | reject |
| eNB information | | | | | | |
| >Global eNB ID | M | | 9.2.1.37 | | YES | reject |
| >eNB Name | O | | PrintableString(SIZE(1..150, ...)) | | YES | ignore |
| Cell information | | | | | | |
| Cell identity PLMN identity | | | | | | |
| UE information | | 1..<max UEs> | | | | |
| >RRC Container | | | | Includes the RRC Handover Preparation | | |

TABLE 1-continued

| IE/Group Name | Presence | Range | IE type and reference | Semantics description | Criticality | Assigned Criticality |
|---|---|---|---|---|---|---|
| Direction: eNB → eNB | | | | | | |
| | | | | Information message as defined in subclause 10.2.2 of TS 36.331 [16]. | | |

In some demonstrative embodiments, eNB 304 may send to eNB 302 an acknowledgement message, e.g., en eNB migration acknowledge 308, to acknowledge the eNB migration request message 306.

Referring back to FIG. 1, in some demonstrative embodiments the procedure of inter-BBU pool migration may include, for example, switching control from the source BBU processing pool and/or source eNB to the target BBU processing pool and/or target eNB, for example, as part of a migration stage, procedure, or operation.

In some demonstrative embodiments, switching the control from the source BBU processing pool and/or source eNB to the target BBU processing pool and/or target eNB may include for example, switching a control interface, e.g., a CPRI interface or any other interface, from the source BBU processing pool and/or source eNB to the target BBU processing pool and/or target eNB.

In some demonstrative embodiments, switching the control from the source BBU processing pool and/or source eNB to the target BBU processing pool and/or target eNB may include for example, switching a S1 interface from the source BBU processing pool and/or source eNB to the target BBU processing pool and/or target eNB.

In some demonstrative embodiments, pool processor 204 (FIG. 2) of the source BBU processing pool, e.g., BBU processing pool 102 (FIG. 1), may be configured to trigger a switching element, e.g., switch 214 (FIG. 2), between the source BBU processing pool and the RRH, which is being transferred to the target BBU processing pool, to switch a control path of the RRH to the target BBU processing pool, e.g., to BBU processing pool 104.

In some demonstrative embodiments, a signaling for switching control over the RRH from the source BBU processing pool to the target BBU processing pool may be based, for example, on a network topology, e.g., as described below.

In some demonstrative embodiments, switch 214 (FIG. 2) may include, for example, an I/Q switch, which may be configured to switch a control path, e.g., a CPRI path or any other control protocol path used between the BBU and the RRH, from the source BBU processing pool and/or source eNB to the target BBU processing pool and/or eNB.

Figure 4:
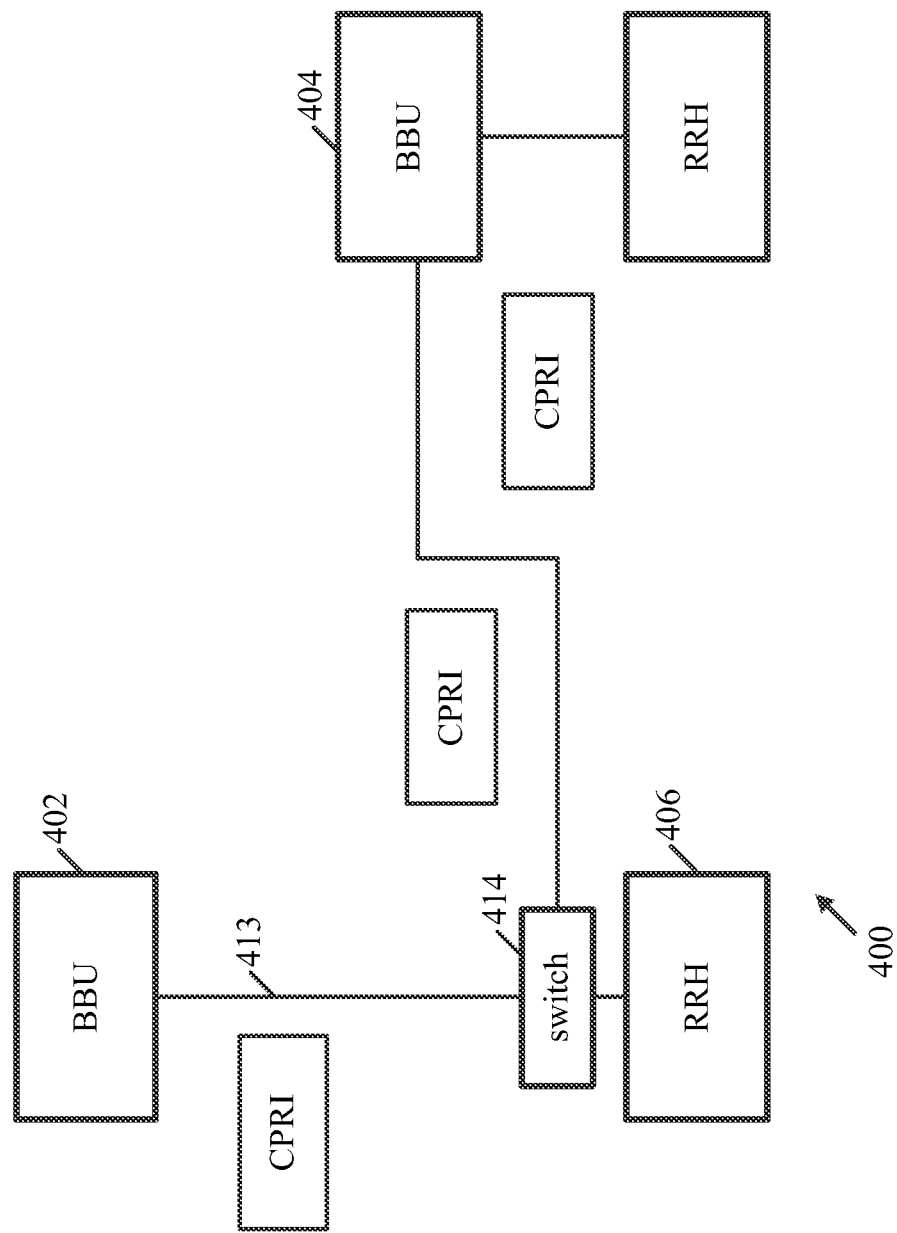
FIG. 4 is a schematic block diagram illustration of a switching topology to switch a Remote Radio Head (RRH) between BBU processing pools, in accordance with some demonstrative embodiments.

Reference is made to FIG. 4, which schematically illustrates a switching topology 400 to switch a RRH 406 between a BBU processing pool 402 and a BBU processing pool 404, in accordance with some demonstrative embodiments. For example, switching topology 400 may be implemented by system 100 (FIG. 1), for example, to switch control over RRH 110 (FIG. 1), RRH 112 (FIG. 1), and/or RRH 114 (FIG. 1), for example, between BBU processing pool 102 (FIG. 1) and BBU processing pool 104 (FIG. 1); and/or to switch control over RRH 120 (FIG. 1), RRH 122

(FIG. 1), and/or RRH 124 (FIG. 1), for example, between BBU processing pool 102 (FIG. 1) and BBU processing pool 104 (FIG. 1).

In some demonstrative embodiments, as shown in FIG. 4, a switch 414 may be located in RRH 406 and/or in close proximity to RRH 406.

In some demonstrative embodiments, as shown in FIG. 3, BBU processing pool 402 may be configured to control switch 414, for example, via the transport network, e.g., via a CPRI 413.

Figure 5:
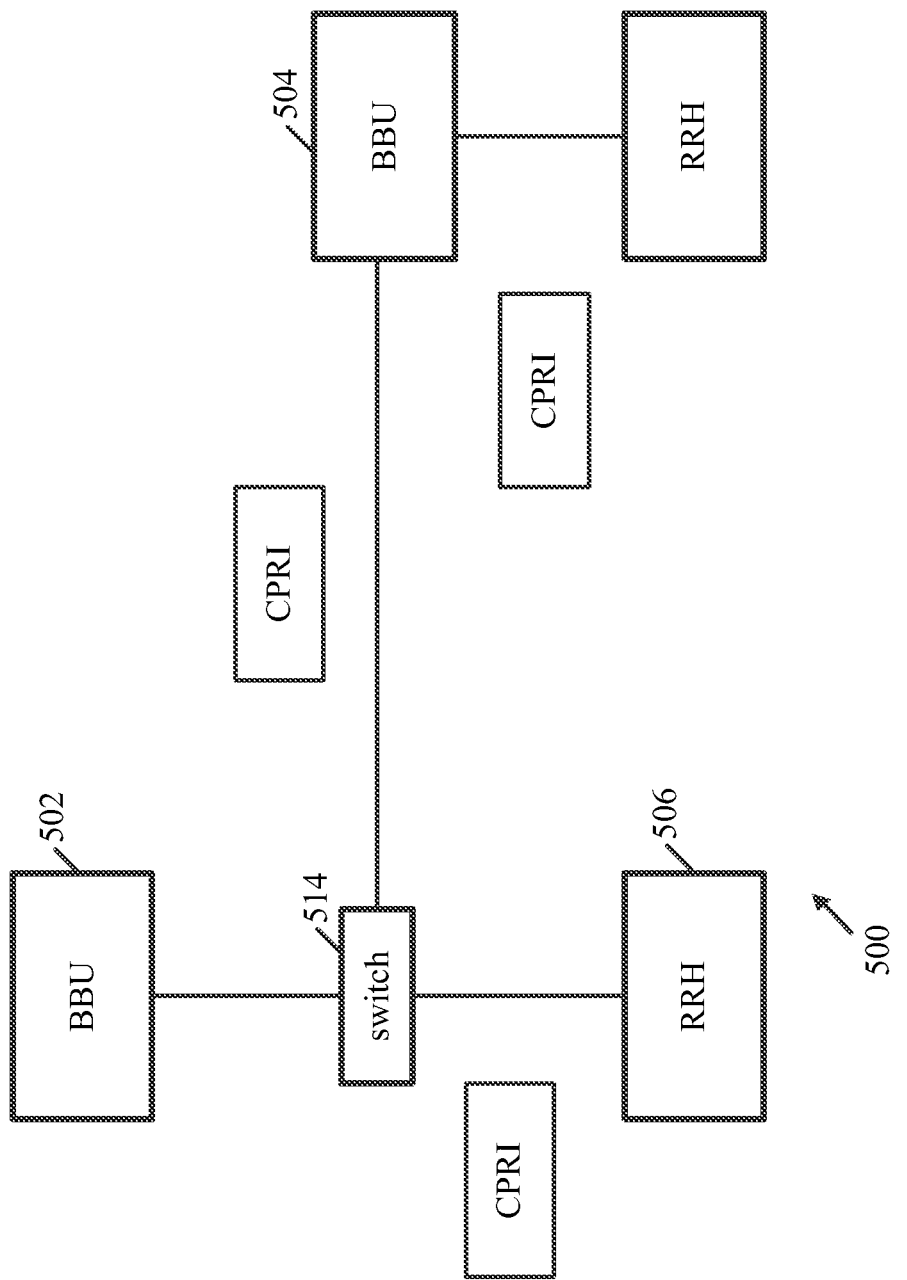
FIG. 5 is a schematic block diagram illustration of a switching topology to switch a Remote Radio Head (RRH) between BBU processing pools, in accordance with some demonstrative embodiments.

Reference is made to FIG. 5, which schematically illustrates a switching topology 500 to switch a RRH 506 between a BBU processing pool 502 and a BBU processing pool 504, in accordance with some demonstrative embodiments. For example, switching topology 500 may be implemented by system 100 (FIG. 1), for example, to switch control over RRH 110 (FIG. 1), RRH 112 (FIG. 1), and/or RRH 114 (FIG. 1), for example, between BBU processing pool 102 (FIG. 1) and BBU processing pool 104 (FIG. 1); and/or to switch control over RRH 120 (FIG. 1), RRH 122 (FIG. 1), and/or RRH 124 (FIG. 1), for example, between BBU processing pool 102 (FIG. 1) and BBU processing pool 104 (FIG. 1).

In some demonstrative embodiments, as shown in FIG. 5, a switch 514 may be located in BBU processing pool 502 and/or in close proximity to BBU processing poll 402.

In some demonstrative embodiments, BBU processing pool 402, e.g., a Radio Equipment Control (REC) of BBU processing pool 402, may support one or more slave CPRI ports, e.g., in addition to master CPRI ports, for example, to enable another BBU processing pool, e.g., BBU processing pool 404, to connect to RRH 404 via the REC.

Referring back to FIG. 1, in some demonstrative embodiments the procedure of inter-BBU pool migration may include, for example, the source BBU processing pool and/or source eNB notifying the target BBU processing pool and/or target eNB that the migration is completed, for example, as part of a completion stage, procedure, or operation.

In some demonstrative embodiments, pool processor 204 (FIG. 1) of the source BBU processing pool, e.g., BBU processing pool 102, may be configured to send to the target BBU processing pool, e.g., BBU processing pool 104, a notification that the transfer of the control of the at least one RRH, e.g., RR 110, RRH 112, and/or RRH 114, is complete.

In some demonstrative embodiments, the source eNB may send to the target eNB a message, e.g., a X2AP signaling message, to notify the target eNB that migration has succeeded.

In some demonstrative embodiments, the source BBU processing pool and/or source eNB may be configured to buffer downlink packets of the source BBU processing pool and/or source eNB, for example, during the migration.

In some demonstrative embodiments, the source BBU processing pool and/or source eNB may be configured to forward to the target BBU processing pool and/or the target eNB the buffered downlink packets, e.g., all buffer downlink packets, which may be buffered at the source BBU processing pool and/or source eNB. For example, the source BBU processing pool and/or source eNB may forward the buffered downlink packets to the target BBU processing pool and/or the target eNB, e.g., upon successful completion of the migration.

Figure 6:
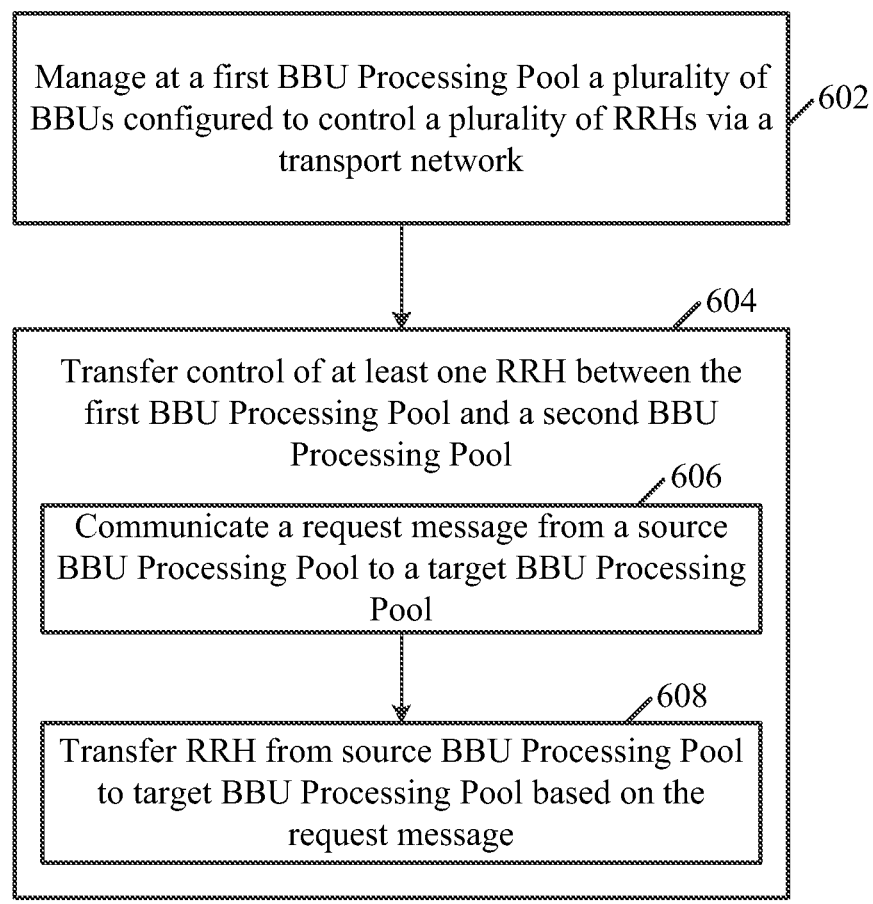
FIG. 6 is a schematic flow-chart illustration of a method of transferring a RRH between BBU processing pools, in accordance with some demonstrative embodiments.

FIG. 6 is a schematic flow-chart illustration of a method of transferring a RRH between BBU processing pools, in accordance with some demonstrative embodiments. For example, one or more of the operations of the method of FIG. 6 may be performed by a wireless communication system e.g., system 100 (FIG. 1); a BBU processing pool, e.g., BBU processing pool 102 (FIG. 1), BBU processing pool 104 (FIG. 1), and/or BBU processing pool 200 (FIG. 2); and/or a pool processor, e.g., pool processor 204 (FIG. 2).

As indicated at block 602, the method may include managing a plurality of BBUs, the plurality of BBUs configured to control a plurality of Remote Radio Heads (RRHs) via a transport network. For example, BBU processing pool 102 (FIG. 1) may manage a plurality of BBUs, e.g., BBUs 207 (FIG. 2), configured to control a plurality of RRHs, for example, RRHs 110, 112 and/or 114 (FIG. 1); and/or BBU processing pool 104 (FIG. 1) may manage a plurality of BBUs, e.g., BBUs 207 (FIG. 2), configured to control a plurality of RRHs, for example, RRHs 120, 122 and/or 124 (FIG. 1), e.g., as described above.

As indicted at block 604, the method may include transferring control of at least one RRH between the first BBU processing pool and a second BBU processing pool. For example, BBU processing pool 102 (FIG. 1) may transfer control of at least one of RRHs 110, 112 and/or 114 (FIG. 1) to BBU processing pool 104 (FIG. 1); and/or BBU processing pool 104 (FIG. 1) may transfer control of at least one of RRHs 120, 122 and/or 124 (FIG. 1) to BBU processing pool 102 (FIG. 1), e.g., as described above.

As indicated at block 606, the method may include communicating a request message from a source BBU processing pool to a target BBU processing pool, the request message including cell information of a cell controlled by the BBU, and User Equipment (UE) information of UEs in the cell. For example, BBU processing pool 102 (FIG. 1) may send the request message to BBU processing pool 104 (FIG. 1), e.g., in order to request to migrate one or more RRHs to BBU processing pool 104 (FIG. 1); and/or BBU processing pool 104 (FIG. 1) may send the request message to BBU processing pool 102 (FIG. 1), e.g., in order to request to migrate one or more RRHs to BBU processing pool 102 (FIG. 1), e.g., as described above.

As indicated at block 608, the method may include transferring control of the RRH from the source BBU processing pool to the target BBU processing pool, e.g., based on the request message. For example, BBU processing pool 102 (FIG. 1) may migrate one or more RRHs to BBU processing pool 104 (FIG. 1); and/or BBU processing pool 104 (FIG. 1) may migrate one or more RRHs to BBU processing pool 102 (FIG. 1), e.g., as described above.

Figure 7:
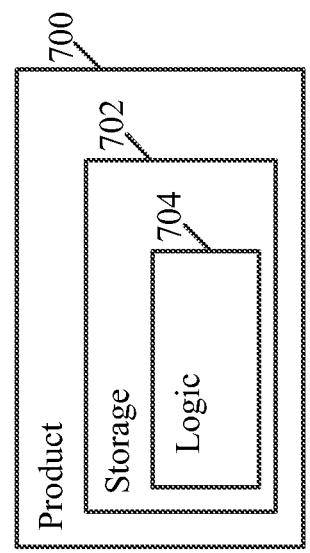
FIG. 7 is a schematic illustration of a product, in accordance with some demonstrative embodiments.

Reference is made to FIG. 7, which schematically illustrates a product of manufacture 700, in accordance with some demonstrative embodiments. Product 700 may include a non-transitory machine-readable storage medium 702 to store logic 704, which may be used, for example, to perform at least part of the functionality of a BBU processing pool, e.g., BBU processing pool 102 (FIG. 1), BBU processing pool 104 (FIG. 1), and/or BBU processing pool 200 (FIG. 2); and/or a pool processor, e.g., pool processor 204 (FIG. 2); and/or to perform one or more operations of the method of FIG. 6. The phrase "non-transitory machine-readable medium" is directed to include all computer-readable media, with the sole exception being a transitory propagating signal.

In some demonstrative embodiments, product 700 and/or machine-readable storage medium 702 may include one or more types of computer-readable storage media capable of storing data, including volatile memory, non-volatile memory, removable or non-removable memory, erasable or non-erasable memory, writeable or re-writeable memory, and the like. For example, machine-readable storage medium 702 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 704 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 704 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes a Base Band Unit (BBU) processing pool comprising a transport network interface to communicate with a plurality of Remote Radio Heads (RRHs) via a transport network; and a pool processor to manage a plurality of BBUs, the plurality of BBUs configured to control the plurality of RRHs according to a RRH control protocol, the pool processor being configured to transfer control of at least one RRH of the plurality of RRHs from at least one BBU of the plurality of BBUs to at least one target BBU processing pool.

Example 2 includes the subject matter of Example 1, and optionally, wherein the pool processor is to cause the BBU processing pool to send a request message to the target BBU processing pool, the request message including cell information of a cell controlled by the BBU, and User Equipment (UE) information of UEs in the cell.

Example 3 includes the subject matter of Example 2, and optionally, wherein the request message comprises an X2 Application Protocol message.

Example 4 includes the subject matter of Example 1 or 2, and optionally, wherein the pool processor is to trigger a switching element between the BBU processing pool and the RRH to switch a control path of the RRH to the target BBU processing pool.

Example 5 includes the subject matter of any one of Examples 1-4, and optionally, wherein the pool processor is to trigger the transfer of the control of the RRH based on a load of the BBU processing pool.

Example 6 includes the subject matter of Example 5, and optionally, wherein the pool processor is to trigger the transfer of the control of the RRH, when the load of the BBU processing pool is greater than a BBU load threshold.

Example 7 includes the subject matter of any one of Examples 1-6, and optionally, wherein the pool processor is to transfer control of all of the plurality of RRHs to the at least one target BBU processing pool.

Example 8 includes the subject matter of Example 7, and optionally, wherein the pool processor is to trigger the transfer of the control of all of the plurality of RRHs, when a load of the BBU processing pool is less than a BBU load threshold.

Example 9 includes the subject matter of any one of Examples 1-8, and optionally, wherein the pool processor is to forward to the target BBU processing pool buffered downlink packets of the BBU.

Example 10 includes the subject matter of any one of Examples 1-9, and optionally, wherein the pool processor is to send to the target BBU processing pool a notification that the transfer is complete.

Example 11 includes the subject matter of any one of Examples 1-10, and optionally, wherein the pool processor is to transfer the control of the RRH based on a request from an Operations and Management (OAM) network entity.

Example 12 includes the subject matter of any one of Examples 1-11, and optionally, wherein the pool processor is to select the target BBU processing pool.

Example 13 includes the subject matter of Example 12, and optionally, wherein the pool processor is to select the target BBU processing pool based on a load of the target BBU processing pool.

Example 14 includes the subject matter of any one of Examples 1-13, and optionally, wherein the pool processor is to trigger the transfer of the control of the RRH based on a load of the target BBU processing pool.

Example 15 includes the subject matter of any one of Examples 1-14, and optionally, wherein the pool processor is to receive an indication of the target BBU processing pool from an Operations and Management (OAM) network entity.

Example 16 includes the subject matter of any one of Examples 1-15, and optionally, wherein the plurality of BBUs include a plurality of virtualized Evolved Node Bs (eNBs).

Example 17 includes the subject matter of any one of Examples 1-16, and optionally, wherein the RRH control protocol comprises a Common Public Radio Interface (CPRI) protocol.

Example 18 includes a Base Band Unit (BBU) processing pool comprising a transport network interface to communicate with a plurality of Remote Radio Heads (RRHs) via a transport network; and a pool processor to manage a plurality of BBUs, the plurality of BBUs configured to control the plurality of RRHs according to a RRH control protocol, the pool processor being configured to receive from a source BBU processing pool a request to transfer control of at least one RRH from the source BBU processing pool to the BBU processing pool, and to cause a BBU of the BBU processing pool to control the RRH.

Example 19 includes the subject matter of Example 18, and optionally, wherein the pool processor is to receive a request message from the source BBU processing pool, the request message including cell information of a cell controlled by the source BBU processing pool, and User Equipment (UE) information of UEs in the cell.

Example 20 includes the subject matter of Example 19, and optionally, wherein the pool processor to cause the BBU of the BBU processing pool to control the RRH according to the cell information and UE information.

Example 21 includes the subject matter of Example 19 or 20, and optionally, wherein the request message comprises an X2 Application Protocol message.

Example 22 includes the subject matter of any one of Examples 18-21, and optionally, wherein the pool processor is to receive from the source BBU processing pool buffered downlink packets for the RRH.

Example 23 includes the subject matter of any one of Examples 18-22, and optionally, wherein the pool processor is to receive from the source BBU processing pool a notification that the transfer is complete.

Example 24 includes the subject matter of any one of Examples 18-23, and optionally, wherein the plurality of BBUs include a plurality of virtualized Evolved Node Bs (eNBs).

Example 25 includes the subject matter of any one of Examples 18-24, and optionally, wherein the RRH control protocol comprises a Common Public Radio Interface (CPRI) protocol.

Example 26 includes a method to be performed by a first Base Band Unit (BBU) processing pool, the method comprising managing a plurality of BBUs, the plurality of BBUs configured to control a plurality of Remote Radio Heads (RRHs) via a transport network; and transferring control of at least one RRH between the first BBU processing pool and a second BBU processing pool.

Example 27 includes the subject matter of Example 26, and optionally, comprising communicating a request message between the first and second BBU processing pools, the request message including a message from a source BBU processing pool to a target BBU processing pool, the request message including cell information of a cell controlled by the source BBU processing pool, and User Equipment (UE) information of UEs in the cell.

Example 28 includes the subject matter of Example 27, and optionally, wherein the request message comprises an X2 Application Protocol message.

Example 29 includes the subject matter of any one of Examples 26-28, and optionally, comprising transferring control of the at least one RRH from the first BBU processing pool to the second BBU processing pool.

Example 30 includes the subject matter of Example 29, and optionally, comprising triggering a switching element between the first BBU processing pool and the RRH to switch a control path of the RRH to the second BBU processing pool.

Example 31 includes the subject matter of Example 29 or 30, and optionally, comprising triggering the transfer of the control of the RRH based on a load of the first BBU processing pool.

Example 32 includes the subject matter of Example 31, and optionally, comprising triggering the transfer of the control of the RRH, when the load of the first BBU processing pool is greater than a BBU load threshold.

Example 33 includes the subject matter of any one of Examples 29-32, and optionally, comprising transferring control of all of the plurality of RRHs to the second BBU processing pool.

Example 34 includes the subject matter of Example 33, and optionally, comprising triggering the transfer of the control of all of the plurality of RRHs, when a load of the first BBU processing pool is less than a BBU load threshold.

Example 35 includes the subject matter of any one of Examples 29-34, and optionally, comprising forwarding to the second BBU processing pool buffered downlink packets for the RRH.

Example 36 includes the subject matter of any one of Examples 29-35, and optionally, comprising sending to the second BBU processing pool a notification that the transfer is complete.

Example 37 includes the subject matter of any one of Examples 29-36, and optionally, comprising transferring the control of the RRH to the second BBU processing pool based on a request from an Operations and Management (OAM) network entity.

Example 38 includes the subject matter of any one of Examples 29-37, and optionally, comprising selecting the second BBU processing pool.

Example 39 includes the subject matter of Example 38, and optionally, comprising selecting the second BBU processing pool based on a load of the second BBU processing pool.

Example 40 includes the subject matter of any one of Examples 29-39, and optionally, comprising triggering the transfer of the control of the RRH to the second BBU processing pool based on a load of the second BBU processing pool.

Example 41 includes the subject matter of any on of Examples 29-40, and optionally, comprising receiving an indication of the second BBU processing pool from an Operations and Management (OAM) network entity.

Example 42 includes the subject matter of any one of Examples 26-28, and optionally, comprising transferring control of the at least one RRH from the second BBU processing pool to the first BBU processing pool.

Example 43 includes the subject matter of Example 42, and optionally, comprising transferring control of the at least one RRH from the second BBU processing pool to the first BBU processing pool, based on a request from the second BBU processing pool.

Example 44 includes the subject matter of any one of Examples 26-43, and optionally, wherein the plurality of BBUs includes a plurality of virtualized Evolved Node Bs (eNBs).

Example 45 includes the subject matter of any one of Examples 26-44, and optionally, comprising controlling the plurality of RRHs according to a Common Public Radio Interface (CPRI) protocol.

Example 46 includes a product including one or more tangible computer-readable non-transitory storage media comprising computer-executable instructions operable to, when executed by at least one computer processor, enable the at least one computer processor to implement a method at a first Base Band Unit (BBU) processing pool, the method comprising managing a plurality of BBUs, the plurality of BBUs configured to control a plurality of Remote Radio Heads (RRHs) via a transport network; and transferring control of at least one RRH between the first BBU processing pool and a second BBU processing pool.

Example 47 includes the subject matter of Example 46, and optionally, wherein the method comprises communicating a request message between the first and second BBU processing pools, the request message including a message from a source BBU processing pool to a target BBU processing pool, the request message including cell information of a cell controlled by the source BBU processing pool, and User Equipment (UE) information of UEs in the cell.

Example 48 includes the subject matter of Example 47, and optionally, wherein the request message comprises an X2 Application Protocol message.

Example 49 includes the subject matter of any one of Examples 46-48, and optionally, wherein the method comprises transferring control of the at least one RRH from the first BBU processing pool to the second BBU processing pool.

Example 50 includes the subject matter of Example 49, and optionally, wherein the method comprises triggering a switching element between the first BBU processing pool and the RRH to switch a control path of the RRH to the second BBU processing pool.

Example 51 includes the subject matter of Example 49 or 50, and optionally, wherein the method comprises triggering the transfer of the control of the RRH based on a load of the first BBU processing pool.

Example 52 includes the subject matter of Example 51, and optionally, wherein the method comprises triggering the transfer of the control of the RRH, when the load of the first BBU processing pool is greater than a BBU load threshold.

Example 53 includes the subject matter of any one of Examples 49-52, and optionally, wherein the method comprises transferring control of all of the plurality of RRHs to the second BBU processing pool.

Example 54 includes the subject matter of Example 53, and optionally, wherein the method comprises triggering the transfer of the control of all of the plurality of RRHs, when a load of the first BBU processing pool is less than a BBU load threshold.

Example 55 includes the subject matter of any one of Examples 49-54, and optionally, wherein the method comprises forwarding to the second BBU processing pool buffered downlink packets for the RRH.

Example 56 includes the subject matter of any one of Examples 49-55, and optionally, wherein the method comprises sending to the second BBU processing pool a notification that the transfer is complete.

Example 57 includes the subject matter of any one of Examples 49-56, and optionally, wherein the method comprises transferring the control of the RRH to the second BBU processing pool based on a request from an Operations and Management (OAM) network entity.

Example 58 includes the subject matter of any one of Examples 49-57, and optionally, wherein the method comprises selecting the second BBU processing pool.

Example 59 includes the subject matter of Example 58, and optionally, wherein the method comprises selecting the second BBU processing pool based on a load of the second BBU processing pool.

Example 60 includes the subject matter of any one of Examples 49-59, and optionally, wherein the method comprises triggering the transfer of the control of the RRH to the second BBU processing pool based on a load of the second BBU processing pool.

Example 61 includes the subject matter of any one of Examples 49-60, and optionally, wherein the method comprises receiving an indication of the second BBU processing pool from an Operations and Management (OAM) network entity.

Example 62 includes the subject matter of any one of Examples 46-48, and optionally, wherein the method comprises transferring control of the at least one RRH from the second BBU processing pool to the first BBU processing pool.

Example 63 includes the subject matter of Example 62, and optionally, wherein the method comprises transferring control of the at least one RRH from the second BBU processing pool to the first BBU processing pool, based on a request from the second BBU processing pool.

Example 64 includes the subject matter of any one of Examples 46-63, and optionally, wherein the plurality of BBUs includes a plurality of virtualized Evolved Node Bs (eNBs).

Example 65 includes the subject matter of any one of Examples 46-64, and optionally, wherein the method comprises controlling the plurality of RRHs according to a Common Public Radio Interface (CPRI) protocol.

Example 66 includes an apparatus of managing a first Base Band Unit (BBU) processing pool, the apparatus comprising means for managing a plurality of BBUs, the plurality of BBUs configured to control a plurality of Remote Radio Heads (RRHs) via a transport network; and means for transferring control of at least one RRH between the first BBU processing pool and a second BBU processing pool.

Example 67 includes the subject matter of Example 66, and optionally, comprising means for communicating a request message between the first and second BBU processing pools, the request message including a message from a source BBU processing pool to a target BBU processing pool, the request message including cell information of a cell controlled by the source BBU processing pool, and User Equipment (UE) information of UEs in the cell.

Example 68 includes the subject matter of Example 67, and optionally, wherein the request message comprises an X2 Application Protocol message.

Example 69 includes the subject matter of any one of Examples 66-68, and optionally, comprising means for transferring control of the at least one RRH from the first BBU processing pool to the second BBU processing pool.

Example 70 includes the subject matter of Example 69, and optionally, comprising means for triggering a switching element between the first BBU processing pool and the RRH to switch a control path of the RRH to the second BBU processing pool.

Example 71 includes the subject matter of Example 69 or 70, and optionally, comprising means for triggering the transfer of the control of the RRH based on a load of the first BBU processing pool.

Example 72 includes the subject matter of Example 71, and optionally, comprising means for triggering the transfer of the control of the RRH, when the load of the first BBU processing pool is greater than a BBU load threshold.

Example 73 includes the subject matter of any one of Examples 69-72, and optionally, comprising means for transferring control of all of the plurality of RRHs to the second BBU processing pool.

Example 74 includes the subject matter of Example 73, and optionally, comprising means for triggering the transfer of the control of all of the plurality of RRHs, when a load of the first BBU processing pool is less than a BBU load threshold.

Example 75 includes the subject matter of any one of Examples 69-74, and optionally, comprising means for forwarding to the second BBU processing pool buffered downlink packets for the RRH.

Example 76 includes the subject matter of any one of Examples 69-75, and optionally, comprising means for sending to the second BBU processing pool a notification that the transfer is complete.

Example 77 includes the subject matter of any one of Examples 69-76, and optionally, comprising means for transferring the control of the RRH to the second BBU processing pool based on a request from an Operations and Management (OAM) network entity.

Example 78 includes the subject matter of any one of Examples 69-77, and optionally, comprising means for selecting the second BBU processing pool.

Example 79 includes the subject matter of Example 78, and optionally, comprising means for selecting the second BBU processing pool based on a load of the second BBU processing pool.

Example 80 includes the subject matter of any one of Examples 69-79, and optionally, comprising means for triggering the transfer of the control of the RRH to the second BBU processing pool based on a load of the second BBU processing pool.

Example 81 includes the subject matter of any one of Examples 69-80, and optionally, comprising means for receiving an indication of the second BBU processing pool from an Operations and Management (OAM) network entity.

Example 82 includes the subject matter of any one of Examples 66-68, and optionally, comprising means for transferring control of the at least one RRH from the second BBU processing pool to the first BBU processing pool.

Example 83 includes the subject matter of Example 82, and optionally, comprising means for transferring control of the at least one RRH from the second BBU processing pool to the first BBU processing pool, based on a request from the second BBU processing pool.

Example 84 includes the subject matter of any one of Examples 66-83, and optionally, wherein the plurality of BBUs include a plurality of virtualized Evolved Node Bs (eNBs).

Example 85 includes the subject matter of any one of Examples 66-84, and optionally, comprising means for controlling the plurality of RRHs according to a Common Public Radio Interface (CPRI) protocol.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. A first Base Band Unit (BBU) processing pool comprising:
   a transport network interface to communicate with a plurality of Remote Radio Heads (RRHs) via a transport network; and
   a pool processor to manage a plurality of BBUs, the plurality of BBUs configured to control the plurality of RRHs according to a RRH control protocol, the pool processor being configured to transfer control of at least one RRH of said plurality of RRHs from at least one BBU of said plurality of BBUs to at least one second BBU processing pool.

2. The first BBU processing pool of claim 1, wherein said pool processor is to cause said first BBU processing pool to send a request message to the second BBU processing pool, the request message including cell information of a cell controlled by the BBU, and User Equipment (UE) information of UEs in the cell.

3. The first BBU processing pool of claim 2, wherein said request message comprises an X2 Application Protocol message.

4. The first BBU processing pool of claim 1, wherein said pool processor is to trigger a switching element between the first BBU processing pool and the RRH to switch a control path of the RRH to the second BBU processing pool.

5. The first BBU processing pool of claim 1, wherein said pool processor is to trigger the transfer of the control of said RRH based on a load of said first BBU processing pool.

6. The first BBU processing pool of claim 1, wherein said pool processor is to transfer control of all of said plurality of RRHs to the at least one second BBU processing pool.

7. The first BBU processing pool of claim 6, wherein said pool processor is to trigger the transfer of the control of all of said plurality of RRHs, when a load of said first BBU processing pool is less than a BBU load threshold.

8. The first BBU processing pool of claim 1, wherein the pool processor is to forward to the second BBU processing pool buffered downlink packets of the BBU.

9. The first BBU processing pool of claim 1, wherein the pool processor is to transfer the control of said RRH based on a request from an Operations and Management (OAM) network entity.

10. The first BBU processing pool of claim 1, wherein the plurality of BBUs include a plurality of virtualized Evolved Node Bs (eNBs).

11. A first Base Band Unit (BBU) processing pool comprising:
    a transport network interface to communicate with a plurality of Remote Radio Heads (RRHs) via a transport network; and
    a pool processor to manage a plurality of BBUs, the plurality of BBUs configured to control the plurality of RRHs according to a RRH control protocol, the pool processor being configured to receive from a second BBU processing pool a request to transfer control of at least one RRH from the second BBU processing pool to said first BBU processing pool, and to cause a BBU of said first BBU processing pool to control the RRH.

12. The first BBU processing pool of claim 11, wherein said pool processor is to receive a request message from the second BBU processing pool, the request message including cell information of a cell controlled by the second BBU processing pool, and User Equipment (UE) information of UEs in the cell.

13. The first BBU processing pool of claim 12, wherein the pool processor to cause the BBU of said first BBU processing pool to control the RRH according to the cell information and UE information.

14. The first BBU processing pool of claim 12, wherein said request message comprises an X2 Application Protocol message.

15. The first BBU processing pool of claim 11, wherein the pool processor is to receive from the second BBU processing pool buffered downlink packets for the RRH.

16. The first BBU processing pool of claim 11, wherein the plurality of BBUs include a plurality of virtualized Evolved Node Bs (eNBs).

17. A method to be performed by a first Base Band Unit (BBU) processing pool, the method comprising:
    managing a plurality of BBUs, the plurality of BBUs configured to control a plurality of Remote Radio Heads (RRHs) via a transport network; and
    transferring control of at least one RRH between the first BBU processing pool and a second BBU processing pool.

18. The method of claim 17 comprising communicating a request message between the first and second BBU processing pools, the request message including a message from a source BBU processing pool to a target BBU processing pool, the request message including cell information of a cell controlled by the source BBU processing pool, and User Equipment (UE) information of UEs in the cell.

19. The method of claim 17 comprising transferring control of the at least one RRH from the first BBU processing pool to the second BBU processing pool.

20. The method of claim 17 comprising transferring control of the at least one RRH from the second BBU processing pool to the first BBU processing pool.

21. A product including one or more tangible computer-readable non-transitory storage media comprising computer-executable instructions operable to, when executed by at least one computer processor, enable the at least one computer processor to implement operations at a first Base Band Unit (BBU) processing pool, the operations comprising:
    managing a plurality of BBUs, the plurality of BBUs configured to control a plurality of Remote Radio Heads (RRHs) via a transport network; and
    transferring control of at least one RRH between the first BBU processing pool and a second BBU processing pool.

22. The product of claim 21, wherein the operations comprise communicating a request message between the first and second BBU processing pools, the request message including a message from a source BBU processing pool to a target BBU processing pool, the request message including cell information of a cell controlled by the source BBU processing pool, and User Equipment (UE) information of UEs in the cell.

23. The product of claim 21, wherein the operations comprise transferring control of the at least one RRH from the first BBU processing pool to the second BBU processing pool.

24. The product of claim 23, wherein the operations comprise triggering a switching element between the first BBU processing pool and the RRH to switch a control path of the RRH to the second BBU processing pool.

25. The product of claim 21, wherein the operations comprise transferring control of the at least one RRH from the second BBU processing pool to the first BBU processing pool.

* * * * *